United States Patent

[11] 3,633,403

[72] Inventors Patrick H. McDonald
Raleigh, N.C.;
Henry W. Blake, Oak Ridge, Tenn.; Guy A. Myers, Raleigh, N.C.; Claud E. Pugh, Oak Ridge, Tenn.; Edward S. Todd, East Hartford, Conn.
[21] Appl. No. 9,296
[22] Filed Feb. 6, 1970
[45] Patented Jan. 11, 1972
[73] Assignee The United States of America as represented by the Secretary of the Army

[54] HIGH-FREQUENCY VISCOELASTIC VIBRATOR
3 Claims, 10 Drawing Figs.
[52] U.S. Cl. ...................................................... 73/15.6,
73/67.1
[51] Int. Cl. .............................................. G01n 3/32,
G01n 25/00
[50] Field of Search ........................................... 73/15.6,
67.1, 67.4, 67.5; 310/26

[56] References Cited
UNITED STATES PATENTS

| | | | |
|---|---|---|---|
| 2,774,239 | 12/1956 | Fitzgerald ..................... | 73/67.1 |
| 3,323,352 | 6/1967 | Branson ........................ | 73/67.1 |
| 3,256,738 | 6/1966 | Giacomo et al. .............. | 310/26 |
| 2,792,674 | 5/1957 | Balmuth et al. ............... | 310/26 |
| 3,030,803 | 4/1962 | Painter ......................... | 73/67.1 |
| 3,039,297 | 6/1962 | Peter ............................ | 73/15.6 |
| 3,044,028 | 7/1962 | Harris ........................... | 310/26 |

Primary Examiner—Richard C. Queisser
Assistant Examiner—Herbert Goldstein
Attorneys—Harry M. Saragovitz, Edward J. Kelly, Herbert Berl and Robert P. Gibson ABSTRACT: Apparatus for obtaining meaningful data on the high-frequency properties and behavior of viscoelastic substances consisting of a magnetostrictive oscillator driven by a high-frequency power supply and having an exponential horn coupled to each of two opposite ends whereby amplification of the motion of the two opposite ends is obtained to produce an amplified pure full-wave shape of the oscillatory longitudinal (axial) motion generated by the magnetostrictive oscillator. The throats of the exponential horns are mechanically coupled to a cylindrical assembly which comprises a housing for the magnetostrictive oscillator and horns assembly. An outer cylinder or cylinder of greater diameter than the diameter of said housing and at least equal to the length of said housing is positioned concentric therewith to provide an enclosure therefor. A first specimen holder is affixed to the periphery of said assembly intermediate its ends and a second specimen holder is affixed to the interior surface of the outer cylinder opposite the first holder. The specimen is cast or otherwise affixed between these two holders. The mechanical axial oscillations generated by the magnetostrictive oscillator and amplified by the exponential horns are coupled to the assembly which responds thereto to impart axial oscillations to the specimen through the first holder.

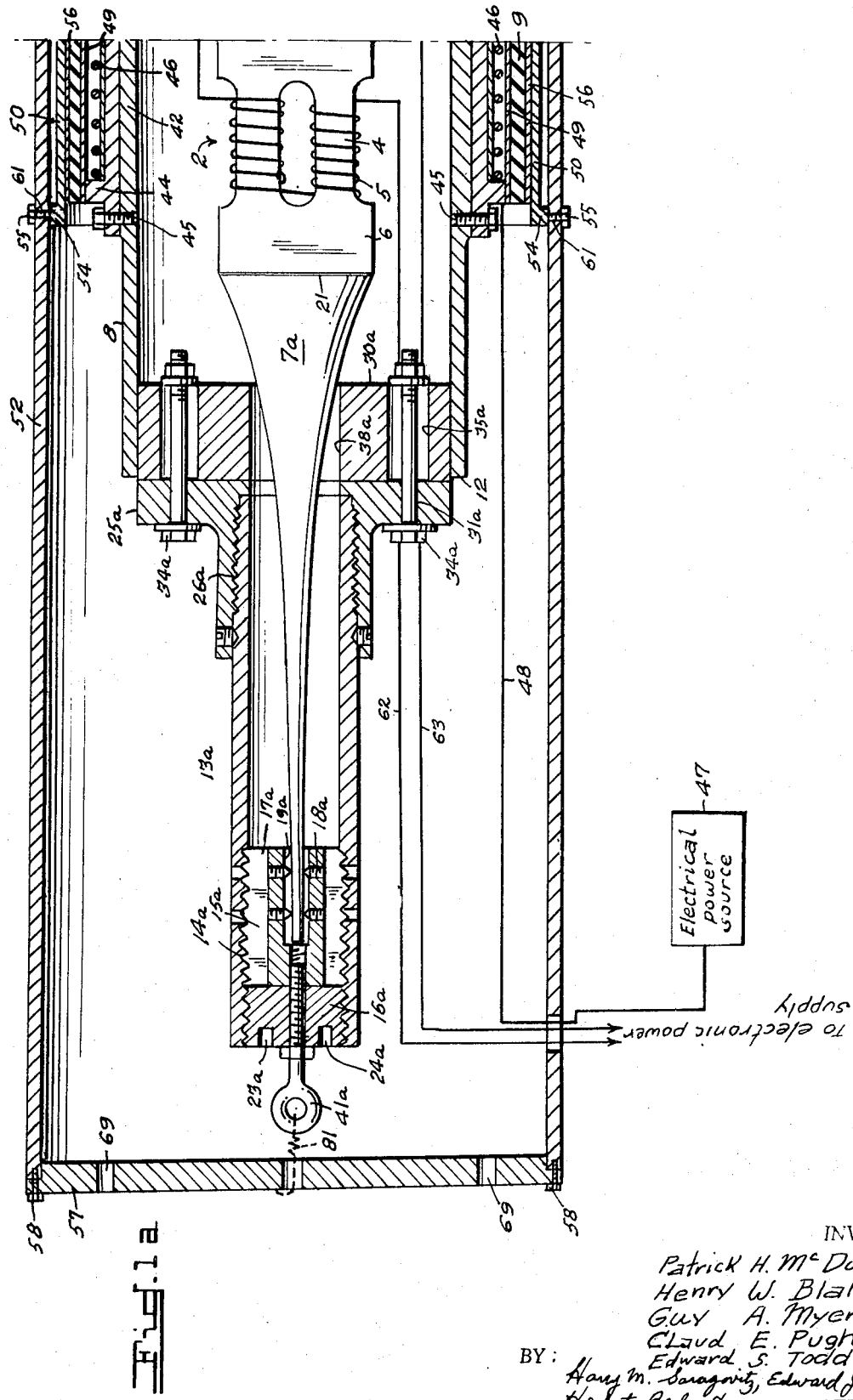

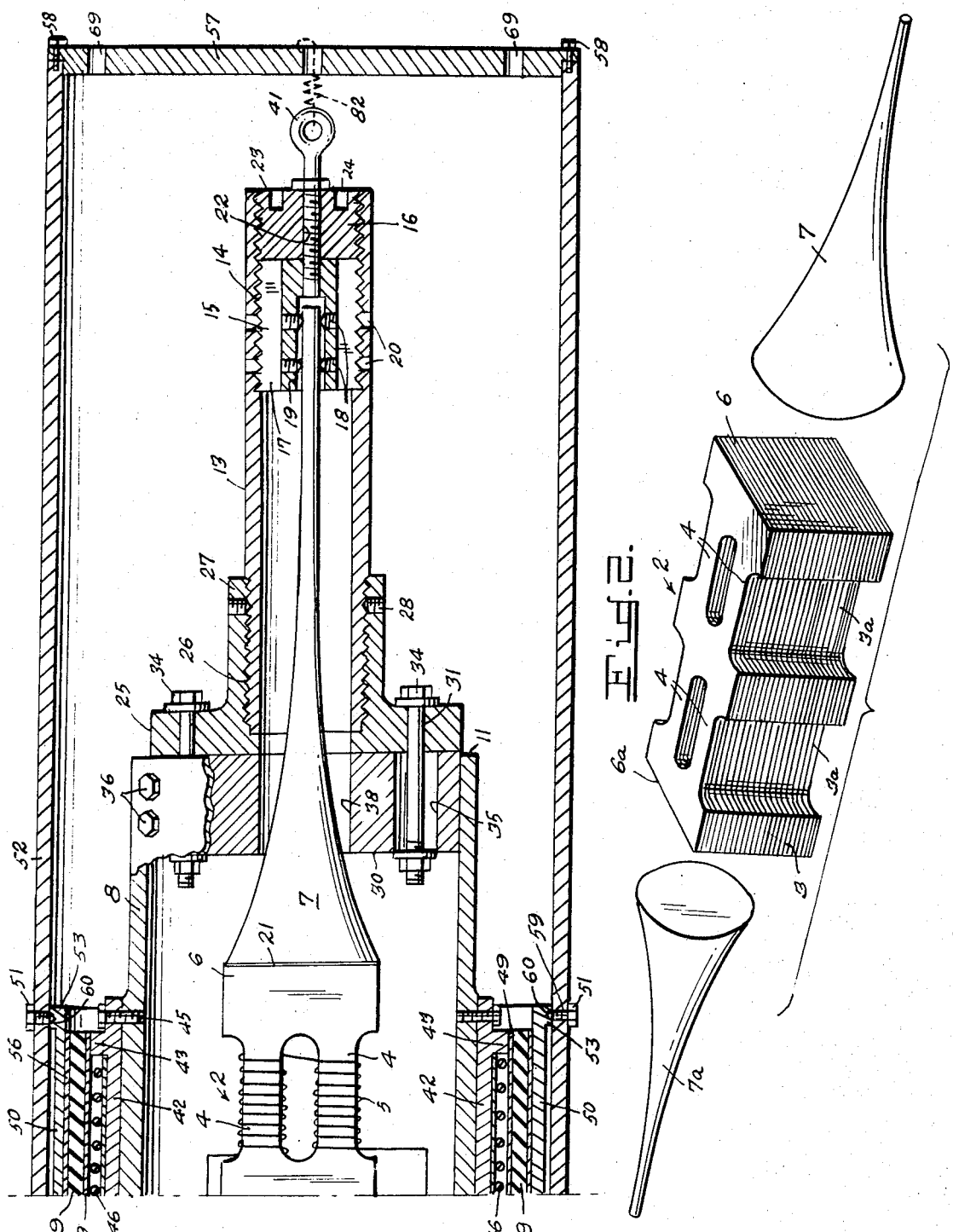

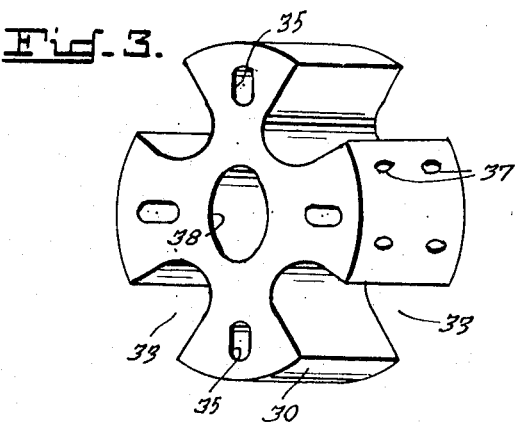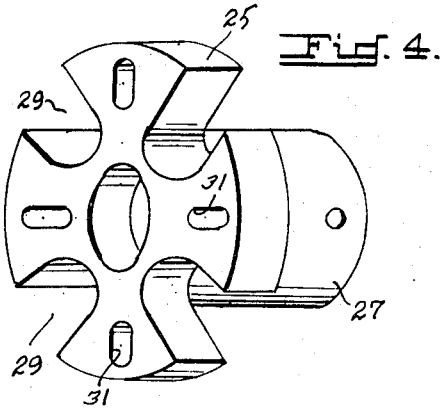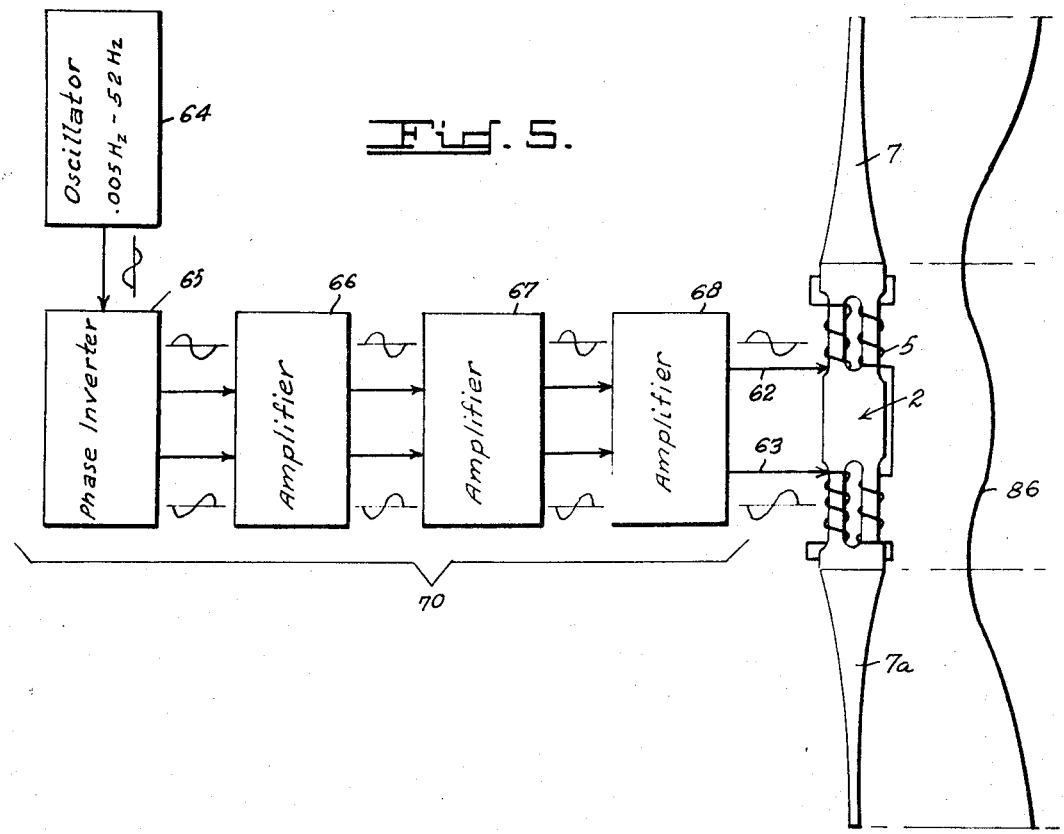

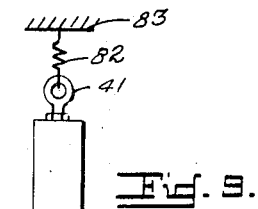
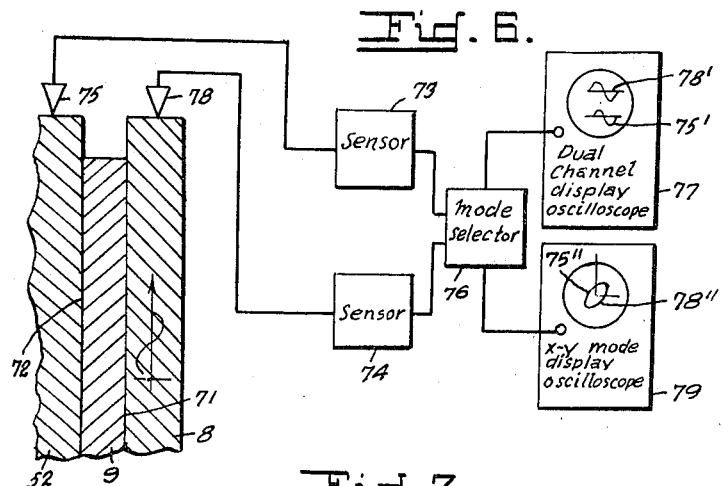
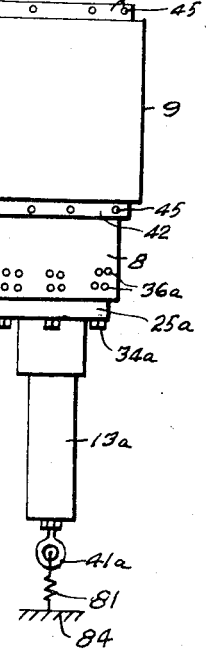
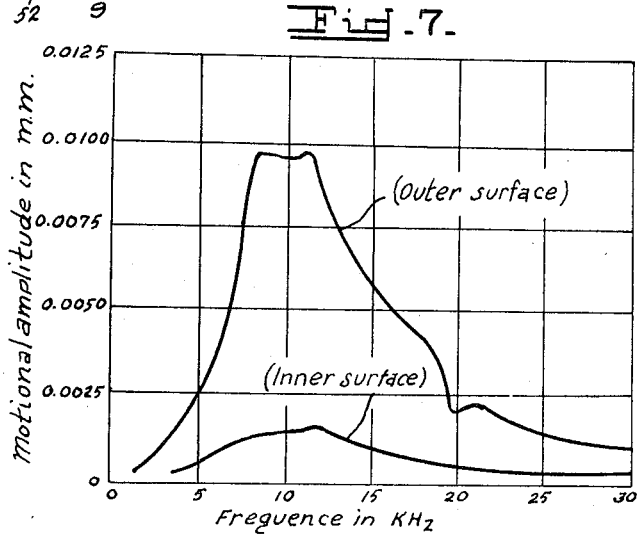
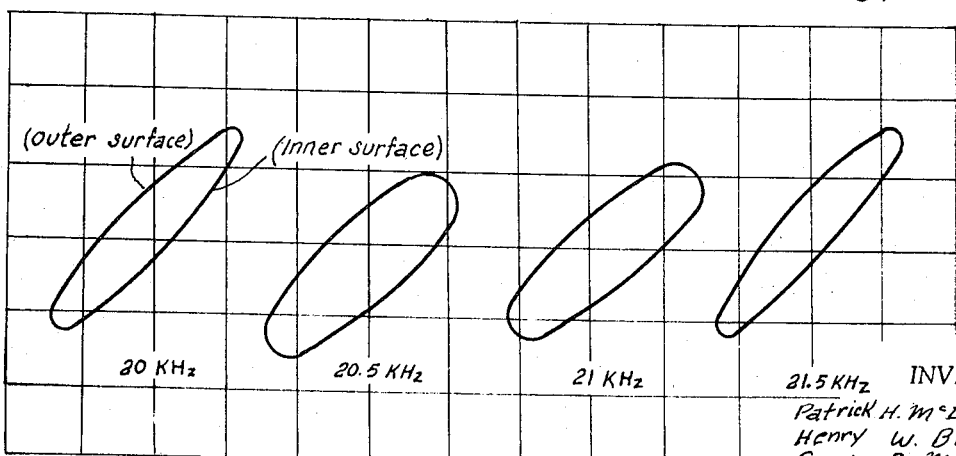

HIGH-FREQUENCY VISCOELASTIC VIBRATOR

The invention relates to vibratory apparatus for the purpose of measuring relevant and significant materials properties through a wide range of frequency and temperature such as the investigation of the behavior of viscoelastic materials under high-frequency excitation which provides an example of prime relevance for a true thermodynamics, because it is precisely for such media subjected to such loadings that coupled thermomechanical effects with gross departures from equilibrium condition can be expected to occur.

An object of the invention is a high-frequency viscoelastic vibrator for obtaining meaningful data on the high-frequency properties and behavior of viscoelastic substances. Specifically, the apparatus of the invention permits taking such data sufficient to characterize the volumetric (dilational) and shear (distortional) spectral tensor operators which relate to stress, stress rate, and higher derivates of stress to the strain, strain rate, and higher derivates of strain under general states of stress for viscoelastic materials in the frequency range of a few hundred Hertz to upwards of 50 kiloHertz.

The novel features that are considered characteristic of the invention are set forth with particularity in the appended claims. The invention itself, however, both as to its organization and method of operation as well as additional objects and advantages thereof will be best understood from the following description taken in conjunction with the accompanying drawings in the several figures of which:

FIG. 1a and FIG. 1b comprise a longitudinal cross-sectional view of a preferred embodiment of the invention;

FIG. 2 is an exploded perspective view illustrating the relationship of the amplifying horns to the magnetostrictive oscillator;

FIG. 3 is a perspective view of one of the end plates;

FIG. 4 is a perspective view of one of the flanges;

FIG. 5 is a block diagram of the electronic power supply for driving the magnetostrictive transducer;

FIG. 6 is a block diagram of the motion-sensing instrumentation;

FIG. 7 is a graph of the motional amplitudes from a test of a room-temperature-vulcanizing rubber specimen;

FIG. 8 is a set of phase difference patterns showing the phase shift between the inner and outer surfaces of a room-temperature-vulcanizing rubber specimen; and FIG. 9 is an elevational view of the high-frequency viscoelastic vibrator assembly resiliently supported between fixed supporting members.

Referring to FIGS. 1a and 1b and FIG. 2, numeral 2 indicates a magnetostrictive oscillator having a body composed of a stack of thin nickel laminations 3, which are formed with cutouts 3a to provide legs 4 and which are bonded with cycleweld under high pressure at elevated temperature. These laminations thus form a unified structure which moves as one element, but the effects of eddy currents in the nickel are thereby reduced or eliminated. Upon each leg 4 is wound turns of insulated copper wire to form a winding 5 thereon in such a fashion that an electric current of whatever frequency upon passing through the windings causes the nickel to change its length in accordance with the current and further so that at any given instant of time the two ends 6 and 6a of the stack of nickel laminations 3 are both moving in synchronism in exactly the same longitudinal sense; i.e., the magnetostrictive oscillator is a full-wave transducer. The winding 5 is coupled by means of leads 62 and 63 to an electronic power supply, one example of which is shown in the block diagram of FIG. 5.

Two identical exponential horns 7 and 7a have their mouth ends affixed to opposite end 6 and 6a of the magnetostrictive oscillator or transducer 2, respectively, by means of an adhesive 21. These exponential horns are mechanically coupled through their throats to a cylindrical transducer housing 8 of aluminum upon which is affixed the test specimen 9 as subsequently explained. Horns 7 and 7a are each turned on a lathe from high fatigue strength steel stock to a perfect exponential shape in accordance with the design principles elaborated in many texts, such as "Electromechanical Transducers and Wave Filters" by W. P. Mason (published by D. Van Nostrand Company, Princeton, N.J. who invented the exponential horn. These horns serve to magnify or amplify the motion of the ends of full-wave transducer 2 inversely as the ratio of the diameters of their ends, and are further required to maintain a pure half-wave shape of the oscillatory longitudinal (axial) motion at the resonant frequency of the transducer 2. Thus, the opposite ends of the two horns move in synchronism in exactly the same longitudinal sense at each instant of time.

Each end of transducer housing 8 carries identical means for coupling the transducer and horns assembly to the housing 8 whereby the longitudinal vibrations generated and amplified by said assembly are coupled to housing 8 and hence to the test specimen 9. Such means are described as follows in regard to end 11 of transducer housing 8, it being understood that such description is also descriptive of the identical coupling means affixed to end 12 of transducer housing 8 in regard to exponential horn 7a and wherein the components thereof corresponding to components of coupling means affixed to end 11 of transducer housing 8 are assigned the same reference characters but bearing the subscript a. The horn housing 13 is an aluminum tube formed with internal threads 14 at one end which are engaged by a threaded horn stop 15 and with external threads 26 at the opposite end thereof. A threaded endplug 16, formed with a longitudinal bore 22, is positioned in horn housing 7 adjacent horn stop 15 and is provided with radial holes 23 and 24 for the purpose of accepting a spanner wrench whereby end plug 16 is tightened against and locks the horn stop 15 within housing 13. The horn stop 15 is formed with a longitudinal bore 19 in which is received the cylindrical end of horn 7 and four axial cutout passages 17 whose function is to facilitate assembly of horn stop 15 to horn housing 13 and permit airflow through housing 13 to the exterior through radial perforations 20 formed in housing 13. Horn stop 15 is fitted with eight radially spaced setscrews 18, four of which are equally spaced in each of two axial planes. These setscrews are tipped with brass shoes and serve to permit both axial and centering alignment of the cylindrical end portion of exponential horn 7 in the longitudinal bore 19. Perforations 20 also permit access to setscrews 18. Eye screw 41 which is employed in certain modes of operation passes through bore 22 and engages a threaded portion of longitudinal bore 19 of horn stop 15.

A flange 25, FIG. 4, which makes a transition from the horn housing 13 to the larger diameter transducer housing 8 serves to accept said opposite end of the horn housing by screwing the horn housing into the internally threaded portion 26. Flange 25 has a locating shoulder 27 protruding exteriorly of housing 8 for establishing the axial position of the horn housing and setscrews 28 in said shoulder for locking the horn housing therein. Axial cutouts 29 permit cooling air to flow therethrough to the exterior and oval boltholes 31 permit circumferential location of flange 25 against end plate 30, FIG. 3, whereby the axial airflow cutouts 33 of end plate 30 are aligned with airflow cutouts of flange 25. Flange 25 and end plate 30 are bolted together by means of bolts 34 passing through oval holes 31 and 35, respectively. End plate 30 is provided with a longitudinal bore 38 to accommodate horn 7 and is affixed internally in housing 8 at end 11 by means of machine screws 36 which pass through perforations in housing 8 and engage threaded bores 37 in end plate 30.

The inner specimen holder 42 comprising a heat source base is an aluminum cylinder formed with shoulders 43 and 44 adjacent opposite ends thereof which is closely fitted over the peripheral surface of transducer housing 8 intermediate its ends 11 and 12 retained thereon by means of machine screws 45. The heat source consists of a coil 46 of nichrome wire wound on asbestos paper on the peripheral surface of inner specimen holder 42 between its shoulders 43 and 44. The ends of coil 46 are connected to an electrical power source 47 by means of cable 48 for supplying electrical current thereto. Reference numeral 49 indicates the inner specimen holder liner which is a piece of 1/16-inch copper sheet formed in a cylinder concentric with inner specimen holder 42 extending between and fitting snugly on end shoulders 43 and 44.

The outer specimen holder 50 comprising a heat sink is an aluminum cylindrical member of greater diameter than inner specimen holder 42 and is positioned concentric therewith by means of machine screws 51 in engagement with threaded perforations 59 in outer housing 52 and peripheral groove 60 in shoulder 53 which is formed on holder 50 adjacent one end thereof. The end of holder 50 opposite said one end is formed with a shoulder 54 engaged by machine screws 55 in threaded perforations 61 in outer housing 52 for the purpose of axially aligning the above-described assembly with outer housing 52. The outer specimen holder is provided with a liner 56 which is a 1/16-inch thick copper sheet rolled to fit snugly therein and extends approximately the length thereof.

The viscoelastic specimen 9 from which graphs of FIGS. 7 and 8 were obtained in an annulus of room-temperature-vulcanizing rubber ⅛ inch thick, 12 inches long and 9 ⅝ inches in diameter. It is cast or otherwise attached between the inner specimen holder liner 42 and outer specimen holder liner 56.

The outer housing 52 is a metal cylinder surrounding and concentric with the transducer and horns assembly and of length at least equal to said assembly. Housing 52 plays the role of a grounded (stationary) machine frame against which the entire apparatus is assembled in one mode of operation. At each end of housing 52 there is fitted a support plate 57 which is retained thereon by means of machine screws 58. Each plate 57 is provided with axial holes 69 to permit circulating of air over the assembled apparatus.

An electronic power supply 70 of conventional design which drives the magnetostrictive transducer 2 is shown in block diagram in FIG. 5. In one embodiment of the electronic power supply the basic source of oscillation is a standard laboratory oscillator 64 having a frequency range of 0.005 Hz. to 52 kHz. with an output amplitude up to 10 volts and a frequency accuracy of 1 percent. The phase inverter and voltage amplifier 65 converts the single-ended oscillator output voltage into a push-pull signal at several watts power level. Coupled between phase inverter 65 and the windings 5 of magnetostrictive transducer 2 is an amplifying means comprising three stages of push-pull amplification 66, 67 and 68 each of which has a power gain of approximately 10. The output stage 68 is provided with a specially designed output transformer incorporating taps to match various impedance levels corresponding to magnetostrictive oscillator 2 inputs which are connected to windings 5 by means of leads 62 and 63. In being understood that windings 5 may be arranged so that the magnetostrictive oscillator 2 functions as a half-wave oscillator. Reference numeral 86 indicates a graphical representation of the oscillatory motion waveform developed by magnetostrictive oscillator 2 in response to the excitation thereof by the electronic power supply 70, and also the amplitude amplification of said waveform by horns 7 and 7a.

In operation, the windings 5 of magnetostrictive oscillator or transducer 2 are coupled to the AC output of electronic power supply 70 whereby magnetostrictive oscillator 2 is excited in such a fashion that the AC current passing through the windings 5 causes the nickel of the stacked nickel laminations to change its length in accordance with the current and further so that at any instant of time the two ends 6 and 6a of the stacked laminations are both moving in synchronism in exactly the same longitudinal sense; i.e., the oscillator is a full-wave transducer. The opposed exponential horns 7 and 7a having their mouth ends affixed to ends 6 and 6a, respectively, of magnetostrictive oscillator 2 amplify the motion at ends 6 and 6a and in response thereto maintain a pure half-wave shape of oscillatory (axial) motion at the resonant frequency of the magnetostrictive oscillator. Thus, the opposite or cylindrical ends of the two horns move in synchronism in exactly the same longitudinal sense at each instant of time. The transducer housing 8 having affixed on the exterior surface thereof a specimen holder 42 supporting a specimen 9 serves as a mechanical unit, each portion of which moves in unison in response to the excitation provided by the magnetostrictive oscillator which is amplified by exponential horns 6 and 7 and transmitted through horn stops 15 and 15a, horn housings 13 and 13a, flanges 25 and 24a, and end plates 30 and 30a, respectively to the transducer housing. The motion thus supplied to the transducer housing is imparted as a uniform axial oscillation to specimen 9 through the inner specimen holder 42. As can be seen by reference to the mode of operation illustrated in FIG. 1, the outer surface of the thin-walled cylindrical specimen 9 is dynamically fixed by means of outer housing 52 through outer specimen holder 50 while the inner surface of the specimen is subjected to a prescribed axial oscillatory motion.

The blocking diagram of FIG. 6 illustrates the method of motion sensing instrumentation employed wherein the inner surface 71 and outer surface 72 of the viscoelastic specimen 9 are positioned between the transducer housing 8 and outer housing 52 as described in the foregoing. Sensing of the amplitudes of motion at the viscoelastic specimen surfaces is accomplished by utilizing novel charge displacement motion sensors 73 and 74 each of which is an electrometer circuit comprising a modification of a cathode follower. Sensor 73 has coupled to its input a transducer 75 which is in contact with outer housing 52 whereby the axial oscillatory motion to which outer surface 72 and outer housing 52 are subjected to is converted into electrical signals coupled by sensor 73 through mode selector 76 to the input of dual channel oscilloscope 77 and displayed in sinesoidal form on the screen thereof as indicated by reference numeral 15'. Similarly the axial oscillatory motion of inner surface 71 is displayed on the screen of oscilloscope 79 as indicated by reference numeral 78' by means of transducer 78, sensor 73 and mode selector 76. To obtain visual representation of the phase shift between the inner and outer surfaces of the specimen, mode selector 76 is manipulated to couple the outputs of sensors 73 and 74 to the input of X-Y mode display oscilloscope 79.

As shown in the circle representing the screen of oscilloscope 79 reference numerals 78'' and 75'' indicate curves representing the phase shift between the inner surface 71 and outer surface 72 motions, respectively, of the specimen.

FIG. 7 is a graph showing the readings, motional amplitude in mm. vs. frequency in kHz. obtained from both the inner surface 71 and outer surface 72 of a room-temperature-vulcanizing rubber specimen 9.

FIG. 8 is a graph illustrating four examples of the phase shift between inner surface 71 and the outer surface 72 motions at various frequencies. It is interesting to note that measurable phase shift was not detected outside the ranges indicated in FIG. 8 throughout the whole spectrum of the test frequencies. That is to say, the room-temperature-vulcanizing rubber specimen 9 apparently behaved as an elastic material except in the range 20 to 21.5 kHz.

The breath of scope of the invention is indicated by the following described possible modes of utilization of the apparatus for determining the high-frequency properties of materials:

a. The heat source 46 and heat sink 50 are both inoperative, but the outer housing 52 is in fact grounded, or at rest.

b. The heat source 46 and heat sink 50 are both operative, in such a manner that the mode of heat transfer from the specimen 9 is forced to radial conduction in the outward direction, with the outer housing 52 grounded.

c. The heat is: 46 and heat sink 50 are both operative, with the mode of heat transfer forced to be radial conduction in the outward direction, but the outer housing 52 removed so that only the inertia of the heat sink 50 is the agent producing a dynamic load upon the specimen 9.

d. The heat source 46 and heat sink 50 are both inoperative, but the outer housing 52 is removed, so that only the inertia of the heat sink 50 is the agent producing a dynamic load upon the specimen 9.

e. The heat source 46 and heat sink 50 are both inoperative, but the high-frequency viscoelastic vibrator assembly is suspended from outer housing 52 by means of springs 81 and 82 (FIGS. 1a and 1b) coupling eyebolts 41 and 41a with the respective support plates 57 so that the motion of the inner surface of specimen 9 is determined by the modulus of these springs.

f. The heat source 46 and heat source 50 are both operative with the mode of heat transfer forced to the radial conduction in the outward direction, but the high-frequency viscoelastic vibrator assembly is vertically suspended between fixed supports 83 and 84 by means of springs 81 and 82 (FIG. 9) which coupled said assembly through eyebolts 41 and 41a, respectively, to said supports so that the motion of the inner surface of specimen 9 is determined by the modulus of said springs.

What is claimed is:

1. A high-frequency vibrator for obtaining meaningful data in the ultrasonic range of the high-frequency properties and behavior of viscoelastic substances comprising in combination:

a first hollow cylindrical member;

a magnetostrictive oscillator positioned along the longitudinal axis of an intermediate the ends of said first hollow cylindrical member whereby the oscillatory motions generated by said magnetostrictive oscillator are directed along said longitudinal axis.

electronic high-frequency generator means coupled to said magnetostrictive oscillator for energizing said oscillator in the ultrasonic range;

mechanical amplifier means coupling the magnetostrictive oscillator between the ends of said first hollow cylindrical member whereby the amplitude of said oscillator motions are amplified and applied to said first hollow cylindrical member to impart amplified axial oscillations to said first hollow cylindrical member;

a second hollow cylindrical member surrounding said first cylindrical member whereby an annulus is formed between said cylindrical members in which is affixed a test specimen of said viscoelastic substances;

means coupled to said first hollow cylindrical member for converting said amplified axial oscillations applied to said first hollow cylindrical member and hence to one surface of and through said specimen into electrical signals;

means coupled to said second hollow cylindrical for converting said amplified axial oscillations transmitted through the specimen to a surface thereof opposite said one surface and hence to said second hollow cylindrical member into electrical signals; and means coupling said electrical signals to oscilloscope display means whereby visual representative of the phase shift between said one surface and said surface opposite said one surface is obtained.

2. The invention in accordance with claim 1 wherein said mechanical amplifier means comprises a first exponential solid metal horn having the base thereof coupled to one end of said magnetostrictive oscillator and the neck thereof coupled to one of said ends of the first hollow cylindrical member, and a second exponential solid metal horn having the base thereof coupled to another end of said magnetostrictive oscillator in opposition to the base of said first horn and the neck thereof coupled to the other of said ends of the first hollow cylindrical member.

3. Apparatus for obtaining meaningful data in the ultrasonic range of the high-frequency properties and behavior of viscoelastic substances comprising in combination, a hollow cylindrical housing provided with a housing extension at each end thereof, a source of vibrator excitation comprising an assembly consisting of a full-wave magnetostrictive oscillator positioned in said housing along the longitudinal thereof whereby the oscillatory vibrations generated by said oscillator are transmitted along said axis, and first and second half-wave exponential horns for amplifying the amplitudes of said oscillator vibrations having the bases thereof coupled in opposition to each other to opposite ends of said oscillator, means coupling the neck of one of said exponential horns to one of said housing extensions and means coupling the neck end of the other of said exponential horns to the other of said housing extensions whereby the amplified oscillatory vibrations of said oscillator are transmitted through the housing extensions to the hollow cylindrical housing, electronic high-frequency generator means coupled to the magnetostrictive oscillator for energizing said oscillator in the ultrasonic range, an inner specimen holder consisting of a cylinder provided with a circumferential shoulder adjacent each end thereof and releasably affixed to the peripheral surface of the hollow cylindrical member, a heat source for heating the specimen to be tested consisting of electrical resistance wire wound on the inner specimen holder between the circumferential shoulders and insulated therefrom, an electrical power source coupled to the heat source for energizing the heat source, an inner specimen liner comprising a cylindrical member extending between the circumferential shoulders and affixed thereto, an outer hollow cylindrical housing provided with means at the ends thereof releasably supporting therein the assembly consisting of said hollow cylindrical housing and extensions thereof containing the magnetostrictive oscillator and horns whereby an outer specimen holder affixed to the interior surface of said outer cylindrical housing is aligned with said inner specimen holder and forms therewith an annulus in which a test specimen of viscoelastic substance is positioned, transducer means coupled to said hollow cylindrical member for converting the amplified oscillator vibrations applied to the hollow cylindrical member and hence to one surface of and through said test specimen into electrical signals, transducer means coupled to said outer hollow cylindrical housing for converting said amplified oscillatory vibrations transmitted through the specimen to a surface opposite said one surface and hence to the outer hollow cylindrical housing into electrical signals, and means coupling said electrical signals to oscilloscope display means whereby visual representation of the phase shift between said one surface and said surface opposite said one surface is obtained.

* * * * *